United States Patent Office 3,445,536
Patented May 20, 1969

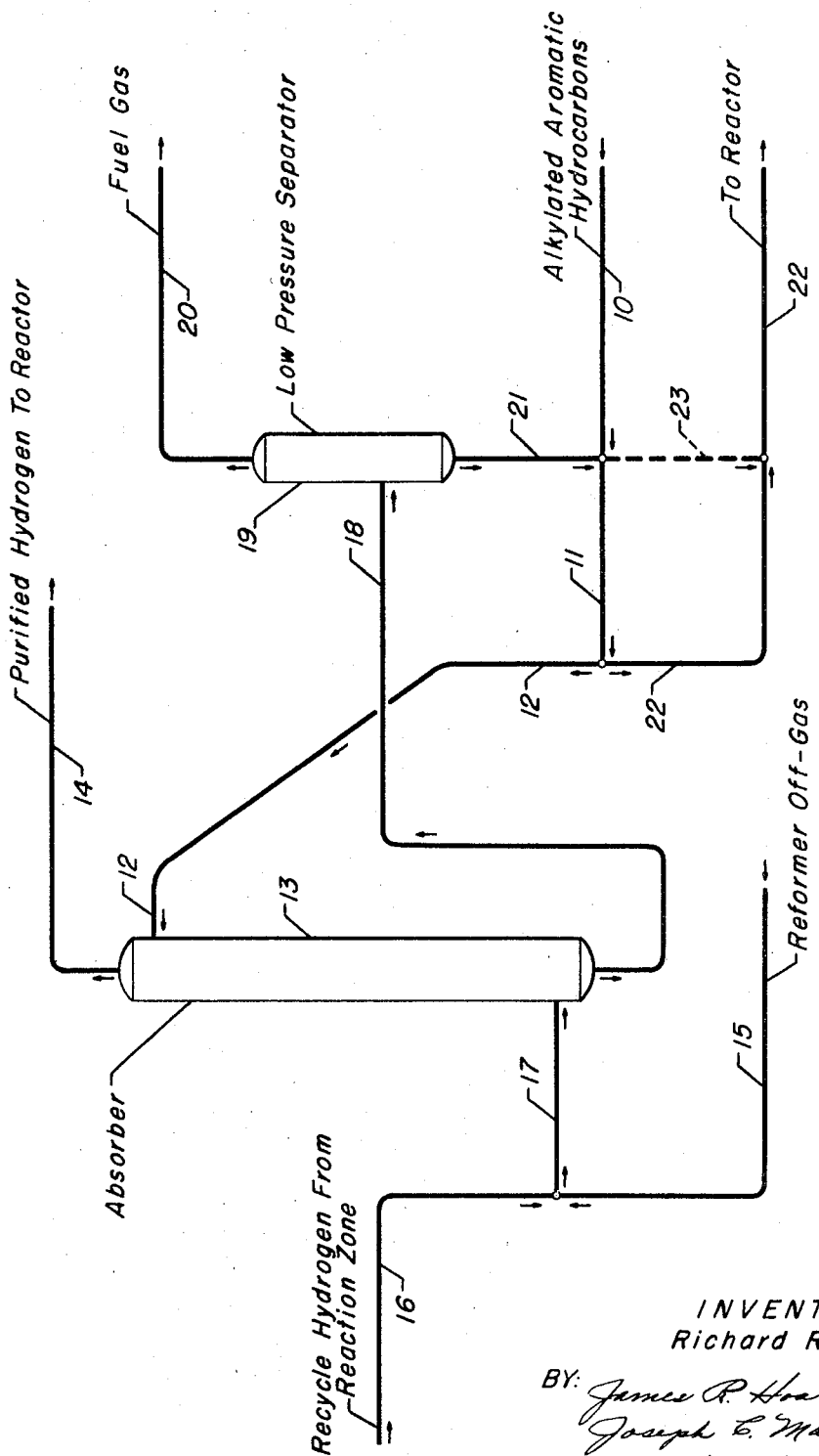

3,445,536
CONVERSION METHOD
Richard R. De Graff, Arlington Heights, Ill., assignor to Universal Oil Products Company, Des Plaines, Ill., a corporation of Delaware
Filed Dec. 27, 1966, Ser. No. 604,982
Int. Cl. C07c 15/04
U.S. Cl. 260—672      3 Claims

ABSTRACT OF THE DISCLOSURE

Method for purifying hydrogen for use in a process for the conversion of hydrocarbons by contacting an impure hydrogen stream with hydrocarbons to be converted. The rich feed hydrocarbons are removed from the absorption zone and passed into a separation zone operating in the substantial absence of an external stripping medium. A purified hydrogen stream having increased hydrogen concentration is removed from the absorption zone. The hydrocarbons to be converted are removed from the separation zone and passed into the conversion zone. A fuel gas stream comprising normally gaseous hydrocarbons is also recovered.

---

The present invention relates to a method for the treatment of gaseous streams. It also relates to the purification of a hydrogen stream via liquid absorption. It particularly relates to a method for conversion of hydrocarbons in the presence of hydrogen. It specifically relates to an improved method for the catalytic hydrodealkylation of toluene to benzene.

In refinery practice various processes commonly employed yield by-product gases containing hydrogen in admixture with methane and other like hydrocarbons such as ethylene, ethane, propylene, propane, butenes, butanes, etc. Examples of such processes are thermal cracking, catalytic cracking, catalytic reforming, various combinations of these processes, and the like. Usually the concentration of hydrogen in these gases is too low to permit its use directly in other processes such as synthesis of ammonia, hydrogenation of edible fats, hydrotreating of, for example, lubricating oils, and recycle of the hydrogen gas to the originating process. Therefore, it is desirable to separate and recover the hydrogen from such other gases for use in refinery operations.

The prior art procedure for separating components of refinery gases usually involves the use of an absorption step in which heavier components are to an extent selectively absorbed from the lighter components by means of an absorption medium, such as a light kerosene, followed by various stripping and reactivating steps for separating the absorbed components from each other. Typically, most of the non-hydrogen gases, such as the $C_1$ to $C_3$ hydrocarbons, are absorbed in the absorption medium during the primary or first absorption step. Then it has been the prior practice to selectively strip the lighter component or components from the rich absorption oil by means of a tower which is operated in such a manner so as to leave higher boiling components dissolved in the absorption oil. The partially stripped oil is next commonly introduced into a second tower where the higher boiling absorbed components are removed and the regenerated lean absorption oil is frequently recycled to the first absorption step for a repeat of the process.

It is to be noted that the prior art process for hydrogen purification using liquid absorption involves complex and expensive equipment for regenerating the absorption oil to recover the absorbed components therefrom. The purified hydrogen is thus obtained at a significantly expensive price for processing equipment and operating cost, such as utilities.

Therefore, it is an object of this invention to provide a process for separating gases.

It is another object of this invention to produce high purity hydrogen from gaseous fractions containing hydrogen and $C_1$ to $C_3$ hydrocarbons.

A further object of this invention is to provide a method for conversion of hydrocarbons in the presence of hydrogen in a more facile and economical manner.

It is a particular object of this invention to provide an improved method for the production of benzene via catalytic hydrodealkylation of toluene.

According to the present invention, a method for conversion of hydrocarbons in the presence of hydrogen comprises the steps of (a) contacting an impure hydrogen stream containing light hydrocarbons as impurities with an absorption medium comprising at least a portion of the hydrocarbons to be converted in an absorption zone under conditions sufficient to absorb light hydrocarbons in said portion; (b) withdrawing from said zone a purified hydrogen stream of increased hydrogen concentration; (c) withdrawing from said zone the absorption medium containing light hydrocarbons removed from the impure hydrogen stream; (d) introducing said withdrawn absorption medium into a separation zone under conditions sufficient to produce a gaseous fraction containing light hydrocarbons and a liquid fraction comprising hydrocarbons to be converted; (e) passing at least a portion of said liquid fraction into a conversion zone maintained under conversion conditions including the presence of said purified hydrogen stream; (f) separating the conversion zone effluent into a liquid fraction comprising converted hydrocarbons and an impure hydrogen stream containing light hydrocarbons; and (g) returning impure hydrogen from step (f) to step (a) for processing aforesaid.

A particular embodiment of this invention provides a method for the production of benzene via the catalytic hydrodealkylation of toluene which comprises (a) contacting an impure hydrogen stream comprising from 50% to 95% by volume hydrogen contaminated with non-hydrogen components including $C_1$ to $C_3$ hydrocarbons with an absorption medium comprising toluene in an absorption zone under absorption conditions including a temperature from 50° F. to 200° F. and a pressure from 200 p.s.i.g. to 3000 p.s.i.g. sufficient to remove $C_1$ to $C_3$ hydrocarbons from said impure hydrogen stream; (b) withdrawing from said zone purified hydrogen stream of increased hydrogen concentration; (c) withdrawing from said zone the absorption medium containing absorbed $C_1$ to $C_3$ hydrocarbons; (d) introducing said withdrawn absorption medium into a separation zone operating in the substantial absence of an external stripping medium and maintained under a pressure from atmospheric to 2975 p.s.i.g., said pressure being at least 25 p.s.i.g. below said absorption zone pressure sufficient to produce a gaseous fraction containing $C_1$ to $C_3$ hydrocarbons and a liquid fraction comprising toluene; (e) admixing said liquid fraction with a charge stream comprising toluene and passing said admixture into a catalytic hydrodealkylation zone in the presence of said purified hydrogen stream under conditions sufficient to dealkylate toluene to benzene; (f) separating the hydrodealkylation zone effluent into a liquid stream containing benzene and a vapor stream containing hydrogen and non-hydrogen components including $C_1$ to $C_3$ hydrocarbons; (g) returning at least a portion of said vapor stream from step (f) to step (a) for processing as aforesaid, and (h) recovering benzene in high concentration from said liquid stream of step (f).

Another particular embodiment of this invention provides a method for purifying hydrogen for use in a process for the conversion of hydrocarbons which comprises contacting an impure hydrogen stream with at least a portion of the hydrocarbons to be converted in an absorption zone under conditions sufficient to absorb impurities into said portion, subsequently separating the impurities from the portion in a separation zone operating in the substantial absence of an external stripping medium, and withdrawing purified hydrogen stream having increased hydrogen concentration from said absorption zone.

The invention is more specifically illustrated in the accompanying drawing which is a schematic flow diagram illustrating one embodiment of the invention.

Referring now to the drawing, impure hydrogen in line 16 from, for example, a hydrodealkylation reaction zone effluent, is admixed with another source of impure hydrogen obtained, for example, from a hydrocarbon catalytic reforming process from line 15. The admixture of impure hydrogen is passed via line 17 into conventional absorber tower 13 wherein the gaseous stream is contacted with a hereinafter specified absorption medium introduced into absorber 13 via line 12. Operating conditions within absorber 13 are maintained so as to effect absorption of at least a major proportion of the non-hydrogen components particularly the $C_1$ to $C_3$ hydrocarbons which were present in the charge gas mixture. From the top of absorber tower 13 purified hydrogen is removed via line 14 and passed, for example, into a hydrocarbon conversion zone such as a catalytic hydrodealkylation zone.

The preferred absorption medium is the charge stock for a hydrocarbon conversion reaction. That is, the hydrocarbons to be converted are used as the absorption medium. For example, alkylated aromatic hydrocarbons such as a stream comprising toluene or alkylnaphthalenes is passed via lines 10, 11, and 12 into absorber 13 for effectuating the absorption of the non-hydrogen components from the charge gas mixture. The absorption medium containing absorbed $C_1$ to $C_3$ hydrocarbons is withdrawn from absorber 13 via line 18 and passed into low pressure separator 19. Desirably, low pressure separator 19 is operated in the substantial absence of external stripping medium, such as steam, and effectuates a flashing of the light hydrocarbons from the alkylated aromatic hydrocarbon absorption medium. These desorbed or flashed light components are removed from separator 19 via line 20 for use, for example, in a refinery fuel system. The denuded absorption medium now comprising alkylated aromatic hydrocarbons (e.g. toluene) is withdrawn from low pressure separator 19 via line 21. Preferably, the material in line 21 is admixed with other alkylated aromatic hydrocarbons, for example, via line 23 and passed to a hydrocarbon conversion zone reactor such as a reactor for the catalytic hydrodealkylation of toluene.

It is noted from the drawing that the feed to the conversion zone is split, with one portion passing via line 12 to absorber 13 and another portion passing via line 22 into the conversion zone reaction system. Those skilled in the art may admix the denuded absorption medium in line 21 at either a point such as line 11 or through line 23 into line 22. Other combinations of admixing or separately handling these streams will be obvious to those skilled in the art.

The absorption conditions utilized in absorber 13 include a temperature from 50° F. to 200 °F. and a pressure from 200 p.s.i.g. to 3000 p.s.i.g., preferably 500 p.s.i.g. to 1000 p.s.i.g. Those skilled in the art will know to choose the operating conditions such that the $C_1$ to $C_2$ hydrocarbons, e.g., light hydrocarbons, are selectively absorbed from the impure hydrogen stream.

Referring again to the drawing, the operating conditions necessary for separation zone 19 include operating the zone in the substantial absence of an external stripping medium, such as steam, and include conditions of pressure from atmospheric to 2975 p.s.i.g. and suitable temperatures to effectuate the flashing of light hydrocarbons from the heavier absorption medium. Generally, the operating pressure in separation zone 19 should be at least 25 p.s.i.g. below the pressure chosen to operate the absorption zone so that a combination of reduced pressure and/or added heat will cause the flashing of the light hydrocarbons from the absorption medium. Suitable heaters and/or coolers, not shown, may be placed in line 18 to aid in the separation to be accomplished in low pressure separator 19.

The preferred embodiment of this invention as aforesaid includes the method for hydrodealkylating toluene for the production of benzene in high concentration. Desirably, the operating conditions for the hydrodealkylation conversion reaction include a temperature from 1000° F. to 1600° F., preferably between 1100° F. and 1300° F.; a pressure from 300 p.s.i.g. to 1000 p.s.i.g. with a range of 200 p.s.i.g. to 500 p.s.i.g. preferred; a hydrogen to hydrocarbon mol ratio of 5:1 to 25:1, preferably from 10:1 to 15:1; and a liquid hourly space velocity from 0.1 to 10, preferably from 0.2 to 5. Those skilled in the art know to choose the operating conditions such that toluene, for example, may be hydrodealkylated to benzene.

In a specific embodiment of this invention, it was noted that the hydrocarbon to be converted was derived from the effluent of a catalytic reforming process. To this extent, it is intended to include the dealkylation of toluene which had been separated from the effluent of a catalytic reforming process. Typically, the toluene is recovered in high concentration by using a suitable solvent to extract the aromatic hydrocarbons from the reformate produced in the reforming operation. Generally, the catalytic reforming operation is performed with a suitable reforming catalyst, such as one containing platinum, at temperatures in the range from 850° F. to 1050° F., and pressures in the range from 450 p.s.i.g. to 1500 p.s.i.g., the conditions being sufficient to produce a net volumetric yield of hydrocarbons boiling at a temperature below the initial boiling point of the charge stock to the catalytic reforming operation, and to produce a net volumetric yield of mononuclear and polynuclear alkylaromatic hydrocarbons. Those skilled in the art are familiar with the operating conditions necessary to produce alkylated aromatic hydrocarbons, e.g. toluene, from feed stocks such as petroleum naphthas having an initial boiling point of about 200° F. and an end boiling point of about 500° F.

The catalyst which may be utilized in the hydrodealkylation reaction associated with the present invention may be prepared in any manner well known in the art. Generally, a dealkylation catalyst may contain a noble metal of Group VIII of the Periodic Table, such as platinum, palladium, rhodium, ruthenium, osmium, iridium, etc., composited on a suitable refractory oxide. In addition, the catalyst may also contain other metals, such as cesium, vanadium, chromium, tungsten, etc., composited on a suitable refractory oxide. It is also contemplated and satisfactory for use herein that combinations of the latter class of metallic components may be utilized with themselves, with a noble metal of Group VIII of the Periodic Table. Suitable refractory oxides which may be used include alumina, particularly aluminas containing a relatively high surface area, such as gamma-alumina, eta-alumina, and theta-alumina, silica, zirconia, silica-alumina, alumina-boria, silica-zirconia-alumina, etc. A particularly effective dealkylation catalyst comprises chromia impregnated on high surface area alumina, said metal being present in an amount of from about 15% to 20% or more.

As used herein, the term "non-hydrogen components" is intended to include all light gases, such as the light hydrocarbons comprising $C_1$ to $C_3$ hydrocarbons, the sour gases and the inerts; but excludes any significant amount of hydrogen. Also, as used herein, the gaseous mixture used as the impure hydrogen stream generally comprises a mixture of hydrogen and methane; however, it is to be understood that the impure hydrogen stream can comprise any gaseous mixture of hydrogen and low molecular weight gases such as the $C_1$ to $C_3$ hydrocarbons. In any event, the impure hydrogen stream should predominate in hydrogen; it should contain more than 50% hydrogen on a volume basis and can contain from 65% to 95% hydrogen.

It is noted from the above description that the present invention is based on the concept of using a conversion reaction charge material to purify the hydrogen which is also to be used in the reaction zone. Accordingly, the various embodiments of the invention utilize the hydrocarbons to be converted as the absorbing medium. It was surprising to discover that the impurity components, such as the $C_1$ to $C_3$ hydrocarbons, could be removed from the absorbing medium by the relatively simple expedient of flash vaporization rather than the expensive absorbing-stripping operation which has been practiced by the prior art for regenerating absorption mediums. It is to be noted, however, that the invention embodies also the use of a recycle stream comprising hydrocarbons to be converted as the absorbing medium, such as the recycle stream comprising toluene which is recovered from the effluent of a catalytic hydrodealkylation process for making benzene.

Furthermore, the present invention embodies utilizing the recycle stream as the absorption medium in conjunction with returning the effluent from the low pressure separator in admixture with fresh toluene-containing charge to the reacting zone. It further embodies mixing the material from the low pressure separator with recycle toluene for passage to the reaction zone. It finally embodies any combination of handling the various streams within the concepts discussed hereinabove which those skilled in the art may desire to use.

The following example illustrates one embodiment of the present invention.

EXAMPLE

With reference to the drawing, a toluene-containing stream was to be converted to benzene. Hydrogen for the reaction was processed as follows:

ponents including $C_1$ to $C_3$ hydrocarbons with an absorption medium comprising toluene in an absorption zone under absorption conditions including a temperature from 50° F. to 200° F., and a pressure from 200 p.s.i.g. to 3000 p.s.i.g. sufficient to remove $C_1$ to $C_3$ hydrocarbons from said impure hydrogen stream;

(b) withdrawing from said zone a purified hydrogen stream of increased hydrogen concentration;

(c) withdrawing from said zone the absorption medium containing absorbed $C_1$ to $C_3$ hydrocarbons;

(d) introducing said withdrawn absorption medium into a separation zone operating in the substantial absence of an external stripping medium and maintained under a pressure from atmospheric to 2975 p.s.i.g., said pressure being at least 25 p.s.i.g. below said absorption zone pressure sufficient to produce a gaseous fraction containing $C_1$ to $C_3$ hydrocarbons and a liquid fraction comprising toluene;

(e) admixing said liquid fraction with a charge stream comprising toluene and pasing said admixture into a catalytic hydrodealkylation zone in the presence of said purified hydrogen stream under conditions sufficient to dealkylate toluene to benzene;

(f) separating the hydrodealkylation zone effluent into a liquid stream containing benzene and a vapor stream containing hydrogen and non-hydrogen components including $C_1$ to $C_3$ hydrocarbons;

(g) returning at least a portion of said vapor stream from step (f) to step (a) for processing as aforesaid; and, (h) recovering benzene in high concentration from said liquid stream of step (f).

2. Method according to claim 1 wherein said hydrodealkylation conditions include a temperature from 1000° F. to 1600° F., a pressure from 300 p.s.i.g. to 1000 p.s.i.g., liquid hourly space velocity from 0.1 to 10, and a hydrogen to hydrocarbon mole ratio from 5:1 to 25:1.

3. Method according to claim 2 wherein said impure

| Line No. | 10 | 11 | 12 | 13 | 14 | 15 | 16 | 17 | 18 | 19 | 20 | 21 | 22 |
|---|---|---|---|---|---|---|---|---|---|---|---|---|---|
| $H_2$ | | 1.52 | 1.43 | | 355.48 | 198.73 | 200.75 | 399.48 | 45.43 | | 43.91 | 1.52 | 0.09 |
| $C_1$ | | 28.04 | 26.40 | | 18.71 | 27.46 | 148.45 | 175.91 | 183.60 | | 155.56 | 28.04 | 1.64 |
| $C_2$ | | 42.18 | 39.71 | | | 23.53 | 12.59 | 36.12 | 75.83 | | 33.65 | 42.18 | 2.47 |
| $C_3$ | | 178.96 | 168.50 | | | 10.46 | | 10.46 | 178.96 | | | 178.96 | 10.46 |
| $C_4$ | | 22.41 | 21.10 | | | 1.31 | | 1.31 | 22.41 | | | 22.41 | 1.31 |
| $C_8P$ | 1.43 | 24.11 | 22.70 | | 0.02 | | | | 22.68 | | | 22.68 | 1.41 |
| BZ | | 53.21 | 50.10 | | | | 3.11 | 3.11 | 53.21 | | | 53.21 | 3.11 |
| Tol | 205.31 | 3,458.58 | 3,256.00 | | 2.93 | | 0.45 | 0.45 | 3,253.52 | | 0.45 | 3,253.07 | 202.38 |
| Total mol hr | 206.74 | 3,808.81 | 3,585.94 | | 377.14 | 261.49 | 365.35 | 626.84 | 3,835.64 | | 233.57 | 3,602.07 | 222.87 |
| Lb./hr | 19,080 | 336,460 | 316,770 | | 1,290 | 2,090 | 3,450 | 5,540 | 321,020 | | 3,640 | 317,380 | 19,690 |
| B.p.s.d | 1,503 | 27,193 | 25,600 | | | | | | 26,560 | | | 25,690 | 1,593 |
| $10^6$ s.c.f.d | | | | | 3.43 | 2.38 | 3.32 | 5.70 | | | 2.21 | | |
| ° F | | | | | 100 | | | | | | 98 | | |
| P.s.i.g | | | | | 635 | | | | | | 75 | | |

The invention claimed is:

1. Method for the production of benzene via the catalytic hydrodealkylation of toluene which comprises:

(a) contacting an impure hydrogen by-product gas stream comprising from 50% to 95% by volume hydrogen and contaminated with non-hydrogen comhydrogen stream of step (a) comprises the hydrogen vapor stream of step (f) admixed with external impure hydrogen from a hydrocarbon catalytic reforming process, and wherein said absorption medium was obtained from said reforming process.

(References on following page)

References Cited

UNITED STATES PATENTS

| | | | |
|---|---|---|---|
| 2,924,569 | 2/1960 | Souby | 208—107 |
| 3,101,380 | 8/1963 | Hariu | 260—672 |
| 3,193,488 | 6/1965 | Carr | 208—68 |
| 3,201,488 | 8/1965 | Sherk et al. | 260—672 |
| 3,213,150 | 10/1965 | Cabbage | 260—667 |
| 3,213,151 | 10/1965 | Sherk | 260—667 |
| 3,248,317 | 4/1966 | Pohlenz et al. | 208—68 X |
| 3,291,849 | 12/1966 | King et al. | 260—672 |
| 3,322,842 | 5/1967 | Czajkowski et al. | 260—672 |
| 3,349,145 | 10/1967 | Uitti | 260—672 |
| 3,362,903 | 1/1968 | Eastman et al. | 208—107 X |

DELBERT E. GANTZ, *Primary Examiner.*

G. E. SCHMITKONS, *Assistant Examiner.*

U.S. Cl. X.R.

208—107, 143